United States Patent
Ellgen et al.

(10) Patent No.: US 7,542,099 B2
(45) Date of Patent: Jun. 2, 2009

(54) APPARATUS AND METHOD FOR PERFORMING INTERNAL ROUTING AND SIGNAL PROCESSING

(75) Inventors: David Leslie Ellgen, Madison, AL (US); Harlan Keith Bond, New Market, AL (US); Steven Miller, Madison, AL (US)

(73) Assignee: Pesa Switching Systems, Inc., Huntsville, AL (US)

( * ) Notice: Subject to any disclaimer, the term of this patent is extended or adjusted under 35 U.S.C. 154(b) by 390 days.

(21) Appl. No.: 11/300,443

(22) Filed: Dec. 15, 2005

(65) Prior Publication Data

US 2007/0143576 A1   Jun. 21, 2007

(51) Int. Cl.
*H04N 5/268* (2006.01)
*H04N 11/20* (2006.01)

(52) U.S. Cl. .................................. 348/706; 348/441
(58) Field of Classification Search .............. 348/705, 348/706, 441, 458, 445, 581; 340/2.2; 345/603, 345/660
See application file for complete search history.

(56) References Cited

U.S. PATENT DOCUMENTS

| | | | | |
|---|---|---|---|---|
| 5,218,436 A | * | 6/1993 | Sugiyama et al. | 348/445 |
| 5,325,131 A | * | 6/1994 | Penney | 348/706 |
| 5,341,178 A | * | 8/1994 | Ebihara et al. | 348/705 |
| 5,734,443 A | * | 3/1998 | O'Grady | 348/705 |
| 6,211,918 B1 | * | 4/2001 | Uwabata et al. | 348/458 |
| 7,034,886 B2 | * | 4/2006 | Ross et al. | 348/445 |
| 2002/0008780 A1 | * | 1/2002 | Han | 348/554 |
| 2004/0036773 A1 | * | 2/2004 | Whitling et al. | 348/207.1 |
| 2005/0024532 A1 | * | 2/2005 | Choi | 348/441 |

* cited by examiner

*Primary Examiner*—Victor R. Kostak
(74) *Attorney, Agent, or Firm*—Buchanan Ingersoll & Rooney PC

(57) ABSTRACT

A system for performing signal processing includes a system input, wherein a first signal having a first format, and supplied on a first system input is selected by a user for format conversion. A switching circuit having plural switching circuit inputs and plural switching circuit outputs is provided for routing the first signal, received via a first switching circuit input, to a first switching circuit output. A processor is connected with the switching circuit for converting the first signal received via the first switching circuit output into a second signal having a second format, wherein the second signal is supplied to a second switching circuit input, and output to a first system output via a second switching circuit output.

19 Claims, 4 Drawing Sheets

APPARATUS AND METHOD FOR PERFORMING INTERNAL ROUTING AND SIGNAL PROCESSING

BACKGROUND

The present application relates to an apparatus and method for performing signal processing.

Switching systems are known which receive, from an external source, signals having a variety of different formats that can be routed via the switching system to specific outputs. Such switching systems, or switchers, include a control system processor, an input, a matrix card and an output. An external conversion unit, under control of a dedicated control system and control signal, is used to create a signal of a desired format which can then be supplied to an input terminal of the switcher for routing to a specific output terminal.

In some cases, a selected signal which has been received at a first input of the switcher can be output from the matrix card to an output of the switcher and then fed back to the external conversion unit for conversion. Afterwards, the converted signal can be fed to a second input of the switcher. The external conversion unit uses multiple input and output terminals of the switcher for signal conversion, and includes a dedicated control system for conversion.

Because the switcher and external conversion unit use dedicated control systems, system synchronization issues can occur. Using an input and an output of the switcher in the conversion process can increase the complexity of connections in the overall system.

For example, conversions of analog input signals to digital output signals (A/D conversion) can involve complex system connections. A conventional system for converting an analog video signal into a digital video signal includes an analog source input that accepts an analog video signal. The analog video signal is fed to an analog video router. An analog signal from the analog video router can be converted to a digital video signal and fed to a digital input source of a digital video router. The digital video router routes the digital video signal to a desired output.

Conversely, a digital signal, such as serial digital (SMPTE 259M compliant) formatted signal, from a digital video router can be digital-to-analog converted (D/A converted) and fed to an analog video router, which routes an analog video signal in a composite NTSC/PAL format to a desired output. The A/D and D/A conversions can involve a large number of cable connections and substantial coordination and synchronization.

Switching systems can consume substantial power and rack space for accommodating external conversion cards and control processors. An operator must ensure that all input and output connections are properly made, and that proper conversion connections are made. This can become more difficult when there are multiple external conversions units.

SUMMARY

Disclosed is a system for performing signal processing, comprising a system input, wherein a first signal having a first format, and supplied on a first system input is selected by a user for format conversion; a switching circuit having plural switching circuit inputs and plural switching circuit outputs for routing the first signal, received via a first switching circuit input, to a first switching circuit output; and a processor connected with the switching circuit for converting the first signal received via the first switching circuit output into a second signal having a second format, wherein the second signal is supplied to a second switching circuit input, and output to a first system output via a second switching circuit output.

Also disclosed is a method for processing a signal comprising selecting a first signal of plural input signals having a first format for format conversion; inputting the first signal into a switching circuit on a first switching circuit input; outputting the first signal from the switching circuit on a first switching circuit output to a processor based on the selection; processing the first signal to a second signal having a second format for input to a second switching circuit input; and outputting the second signal to a system output having an output signal format matching the second format.

Another embodiment comprises a system input, wherein a first signal having a first format, and supplied on a first system input is selected for processing; a first switching circuit having plural switching circuit inputs and plural switching circuit outputs for routing the first signal, received via an input on the first switching circuit, to a first output on the first switching circuit; a second switching circuit, connected with the first switching circuit, having plural switching circuit inputs and plural switching circuit outputs for routing the first signal from the first output of the first switching circuit, via an input of the second switching circuit to an output of the second switching circuit; and a processor connected with the second switching circuit for processing the first signal received via the output of the second switching circuit into a second signal having a second format, wherein the second signal is supplied to a second input of the second switching circuit and output to a second input of the first switching circuit and output to a system output via a second output on the first switching circuit.

BRIEF DESCRIPTION OF THE DRAWINGS

These and other features of the disclosed exemplary embodiments will become better understood with reference to the following description, appended claims, and accompanying drawings where:

DETAILED DESCRIPTION

Figure 1:
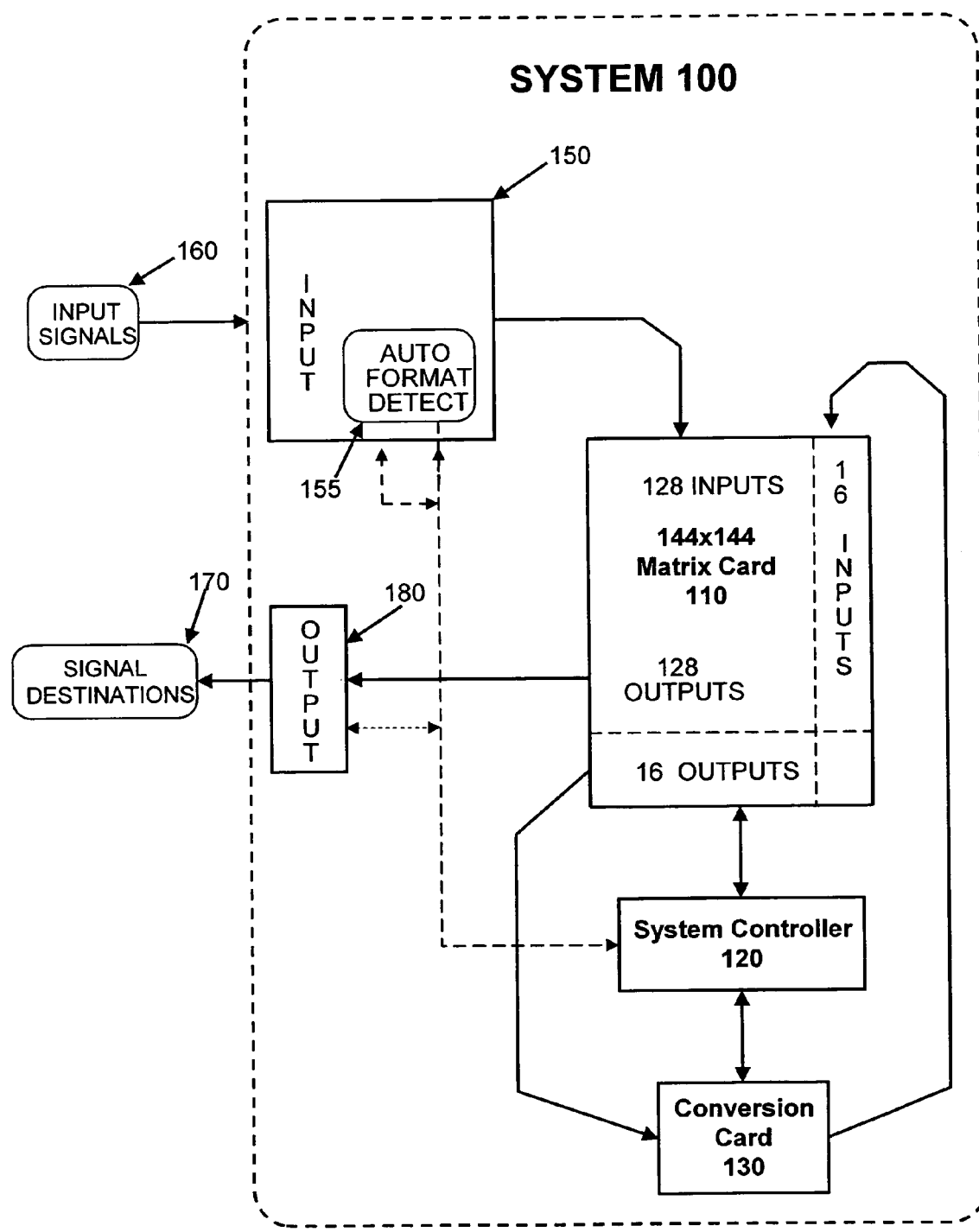
FIG. 1 shows an exemplary signal conversion system block diagram.

FIG. 1 shows an exemplary signal processing system for performing signal processing, having a system rack modular frame capable of switching and/or processing signals. The system is capable of performing a variety of different signal processing functions. For ease of explanation, signal format conversion will be used as one of the variety of signal processing functions to illustrate the operation of the system and should not be considered as limiting the system. By routing signals internally within the system, internal signal processing can be performed. One or more input signals 160 is supplied on a system input to a system input card module 150 on one or more signal input paths. Each of the input signals 160 has a format and is capable of being selected for further processing. Signal destinations 170 are devices capable of receiving one or more output signals from a system output card, or module, 180.

The system 100 is configured to allow routing of at least one of the plurality of input signals 160 through a processor. The system 100 is comprised of a system controller 120, a conversion card 130, which can be configured as a processor, and a matrix card 110. Matrix card 110 is a switching circuit controlled by the system controller 120 and is used for routing one or more of the signal inputs. The system controller 120 can be internal or external to the system 100. Matrix card 110 has plural switching circuit inputs and plural switching circuit outputs for routing signals. The conversion card 130 is used to convert the signal formats of the input signals and can be capable of performing other forms of signal processing, such as inserting digital video effects. The system controller 120, matrix card 110, conversion card 130, input module 150 and output module 180 can be configured into a single rack mountable unit.

The system controller 120 can include one or more controllers. For example, it can include a main controller and an auxiliary frame controller. The auxiliary frame controller manages the signaling to the individual matrix and conversion cards under control of the main controller.

To perform internal signal processing, which is a format conversion in this example, one of the plurality of input signals supplied to matrix card 110 is selected for further processing, such as format conversion, analog-to-digital conversion, digital-to-analog conversion, and so forth. System input signals selected for further processing are routed through the matrix card 110 to the conversion card 130 within the system 100.

The system controller 120 dynamically routes the system input signals selected for further processing through the system 100. The system controller 120 uses the user-selected system input signal format and its corresponding user-selected system output signal format to determine the signal path through the matrix card 110 for converting the system input signal to the user-selected system output signal format. The system controller 120 controls the matrix card 110 to route the system input signal to the conversion card 130 that will perform an appropriate format conversion. The processed or converted signal is routed back into an input of the matrix card 110 for output to the user-selected system output 180.

The system controller 120 can output a conversion parameter control signal to the conversion card 130, which can be configured as a processor, indicating the type of conversion or signal processing to be performed on the signal applied from the user-selected system input. As a result, the user does not have to configure the matrix card 110 inputs and outputs and the specific conversion card 130 to perform the correct conversion or processing and signal output. The system controller 120 performs those functions based on the signal format of the selected system input and the user-selected format for a specified system output. The dynamic routing of the system input signal by the system controller 120 is completely transparent to the user.

Referring to FIG. 1, the conversion card 130 (processor) is connected to the matrix card 110 (switching circuit). A conversion parameter control signal from the system controller 120 can be used to signal the conversion of the selected input signal to a different format, such as from HD1080i to HD720P. The conversion parameter control signal sets the proper signal conversion to be performed on the selected input signal. After conversion to another format in the conversion module 130, the reformatted or processed signal is routed to a second switching circuit input of the matrix card 110 for subsequent output, through a second switching circuit output, to signal destination 170 via a first system output.

Automatic signal format detection can be accomplished by including a format detector circuit 155 on each system input (or group of inputs) 150, which, when locked to the incoming signal, outputs the signal format to the system controller 120. An alternative method of automatically detecting the signal format is to dedicate an output 180 from the system 100 to drive a format detector circuit 155. Each system input 150 is switched to the format detector circuit 155 via output 180 in turn, and the signal format of each input is outputted to the system controller 120. The rate of detection can be limited by the lockup and detection speed of the format detector circuit 155. An FPGA could be programmed to monitor 4 or more inputs and output a signal representative of the detected format to the system controller 120. Therefore, one FPGA reports the signal format of 4 inputs. The number of inputs detected by a single circuit is a design choice limited by cost, space and other such constraints.

Figure 2:
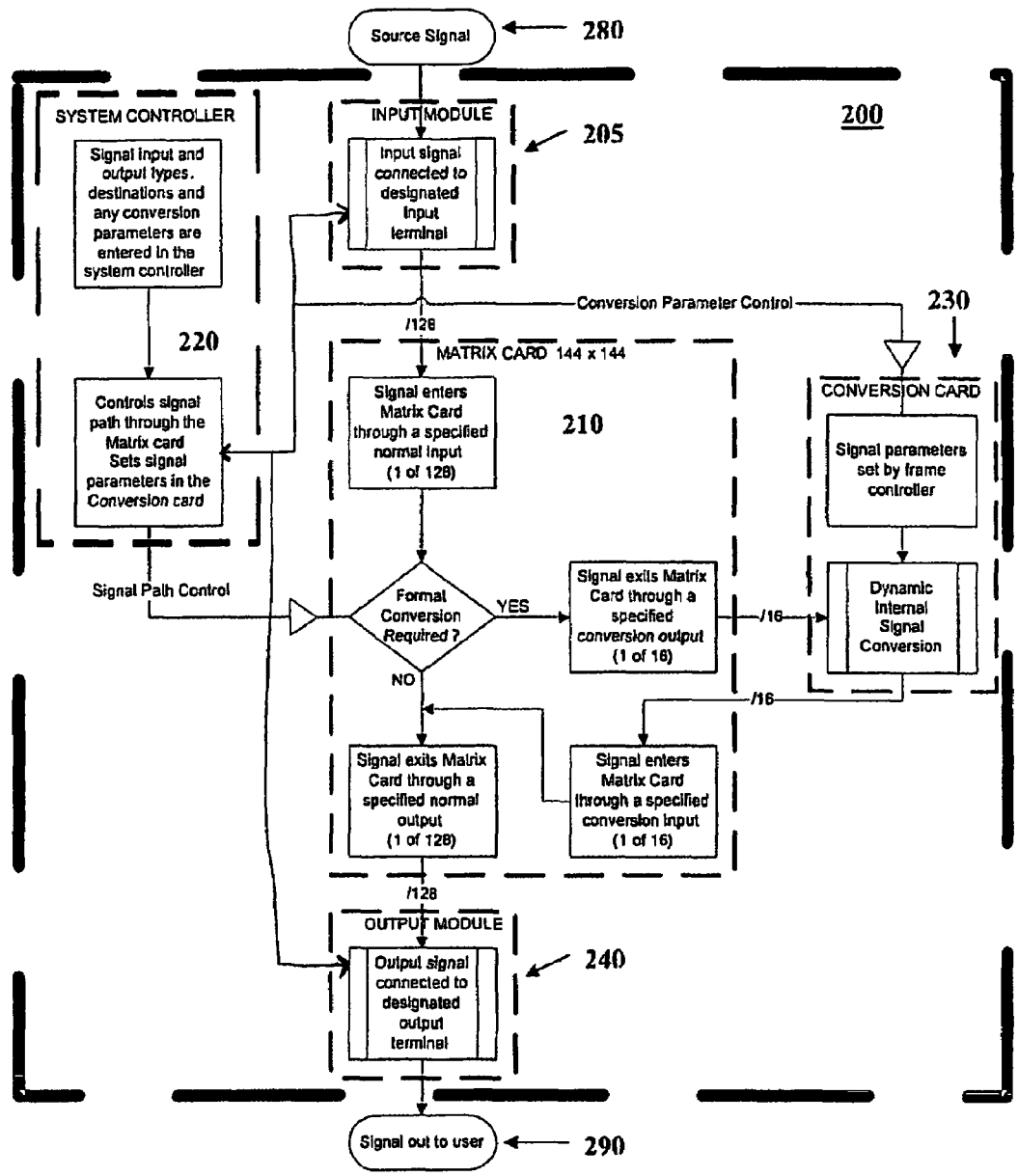
FIG. 2 shows an exemplary functional block diagram.

The overall signal flow will now be described with reference to FIG. 2. FIG. 2 shows a system 200 as a functional block diagram comprised of an input module 205, a system controller 220, a matrix card 210, a conversion card 230, and an output module 240. To configure the system, a user interface is provided via system controller 220. The user interface, such as a graphical user interface (GUI), can be used to establish the signal input and output format types, the destinations of the input signals and any conversion parameters for converting an input signal to a specified output signal format. It is through the GUI that a user can select a signal on a system input for format conversion. Alternatively, the system input signal formats can be established using the automatic signal format detection function. For example, a serial-digital (SD) signal can be supplied on system input A. The system can be configured so that the SD signal on system input A can be routed to system output B as an SD signal and to output C as an HD1080i signal. Once the system is configured, the signal routing to the appropriate conversion card 230 can be dynamically selected based on the input signal format and the selected output signal format.

The type of signal processing to be performed is selected through a user interface with the system controller 220 based on a particular input having a particular signal format. The types of signal processing which the system is capable of performing include: up-conversion, down-conversion, cross-conversion; analog-to-digital conversion; digital-to-analog conversion; embedding with source or channel identification, audio or data channel conversion from a video signal path; diagnostics; frame synchronization; embedding logo generation; addition of digital video effects, and introduction of an adjustable delay, detection, signal correction, signal generation, signal combining, synchronization, encoding, decoding, transcoding, embedding, de-embedding, identification, scrambling, descrambling, compression, decompression or any combination thereof. The previous list is not to be considered exhaustive as other signal processing functions may also be performed. During configuration, the selected input can be designated for use as a specific signal output. The system controller 220 determines the signal format conversion to be performed based on the required output signal format as selected by a user for the specific signal output and outputs a control value based on the determination for routing the input signal. For example, a user specified input signal format, or alternatively, an input signal format determined through automatic signal format detection, and a user specified output signal format set during initial configuration can include identifiers that are easily recognized by the system controller 220, and used, for example, as inputs to a lookup table or database. The corresponding lookup table or database entry identifies the appropriate conversion card 230 and/or path to/from the conversion card 230. The control values(s) can be output based on an identified entry in the lookup table or database included within or accessible by, system controller 220. The control value can be, for example, a serial data stream and a clock signal that are interpreted and implemented by the matrix card 210. The control value can have any format that can be interpreted and implemented as a desired signal routing by the matrix card 210.

The source signal 280 representing one or a plurality of input sources, is connected to the system 200. The source signal 280 can be representative of a plurality of input signals, each of which may have its own predetermined format such as serial digital, high definition, analog, etc. The input signals may be of a variety of standard formats. For example, a high definition signal may be of the HD720P or HD1080i standards. Although, the system will be described with reference to standard video formats, the processing or conversion is not limited to these standard video formats.

Each of the plurality of input signals is connected to an input terminal on the input module 205 designated during initial system set up. After entering the input module 205, the signals pass to the matrix card 210. The input signal enters the matrix card 210 through an input, which may, for example, be up to 128 different inputs, that can be specified during the initial set up. If additional inputs or outputs are required, additional matrix cards 210 may be cascaded to provide the desired number of inputs and outputs.

The matrix card 210 can be of a type, which has 144×144 integrated chips, in a unique routing topology. However, smaller or larger integrated chips, such as 16×16 can be used to build a 144×144 matrix card. Other size matrix cards, such as 288×288 or any other size, can also be used. An exemplary 144×144 cross point switch IC is available from Mind Speed Technology, Inc. (catalog no. M21151 V 144×144 1.6 Gbps cross point switch) for digital applications. Of the 144 inputs and 144 outputs, 128 of the inputs and 128 of the outputs can be used in the traditional matrix implementation. In an exemplary embodiment, the remaining 16 inputs and 16 outputs can be used for internal switching of signals to and from the internal processing circuitry, such as conversion card 230 as desired, or other switching devices.

Once the input signal enters the matrix card 210, it follows the path that has been set for it by the system controller 220. The system controller 220 dynamically routes the signal based on parameters set during initial set up by the user through the graphical user interface.

When a signal is to be converted, a conversion parameter control signal is forwarded to the conversion card 230 from the system controller 220. The conversion parameter control signal sets the type of conversion (processing) and/or conversion (processing) parameters that are to be performed on a particular input signal. The conversion parameter control signal can be representative of the format conversions or signal processing selected through the GUI of the system controller 220. For example, where a conversion card can perform multiple different types of format conversion, the conversion parameter can specify the type of format conversion (from an SD 270 Mbit input into an HD1080i output, for instance) to be performed based on user specified inputs. Alternatively, or in addition, parameters associated with a conversion (such as digital sample rate, or any other desired parameter) can be included with the conversion parameter control signal.

The particular input signal selected for format conversion exits the matrix card 210 through a specified conversion output, such as one of the 16 remaining matrix card 210 outputs, which is connected to the conversion card 230. After being converted to another format based on the conversion parameter control signal, the converted signal is rerouted through a specified conversion input of the matrix card 210, which can be one of the 16 remaining matrix card 210 inputs. After entering the matrix card 210, the converted signal is routed to a normal matrix card 210 output, such as one of the 128 signal outputs.

The converted signal from the matrix card 210 is connected to a designated output module 240 that has been pre-designated by the user to output a converted signal having a specified format (for example, via the graphical user interface of the system controller 220). The output module 240 has a plurality of system output terminals to which signal output devices can connect.

The system 200 is capable of performing multiple types of signal conversion, such as up-conversion, cross-conversion, and down-conversion. In the above description, signal conversion is an exemplary signal processing function that can be selected to be performed on an input signal. The system 200 is capable of performing multiple types of signal processing functions, such as signal correction, scrambling/descrambling and compression/decompression.

A serial-digital signal, for example, may be routed through the matrix card 210. Based on the conversion parameter control signal received from the system controller 220, the serial-digital signal is up-converted to a high definition HD1080i signal format. An example of a cross-conversion is when a signal, such as a high definition HD1080i signal, is applied to the matrix card 210 and, based on the conversion parameter control signal received from system controller 220, is converted to another high definition format, such as HD720P.

The types of signal processing that can be performed internally, besides the up/down conversions and cross-conversions, include digital video effects, frame synchronization, embedding/disembedding of audio, video diagnostics/corrections, logo generation, or any other desired signal processing. These types of signal processing functions are commonly desired by users, but the system is not limited to these types of signal processing. In addition, analog-to-digital and digital-to-analog conversion can be performed.

The user interface of system controller 220 enables signal types for the system inputs to be specified by a user, or alternatively, automatic signal format detection can be used to detect and specify the input signal type. In addition, the types of outputs can be individually specified, or groups of outputs can be specified. The matrix crosspoints, which can be used for switching signals to different formats, can be set as well as the conversion parameters.

---

Exemplary pseudo code for a signal flow is shown below:
READ Source_Signal
Source_Signal enters input card from designated input terminal
Source_Signal exits input card
Source_Signal enters matrix card through a specified normal input
READ Source_Path_Control_Signal
IF Source_Signal Conversion Required THEN
    Source_Signal exits matrix card through a specified conversion
    output
    Source_Signal enters conversion card
    READ Conversion_Parameter_Control_Signal
    Source_Signal converted
    Source_Source re-enters matrix card through a specified conversion
    input
END IF
Source_Signal exits matrix card through a specified normal output
Source_Signal enters output card
Source_Signal exits output card through a designated output terminal

---

Figure 3:
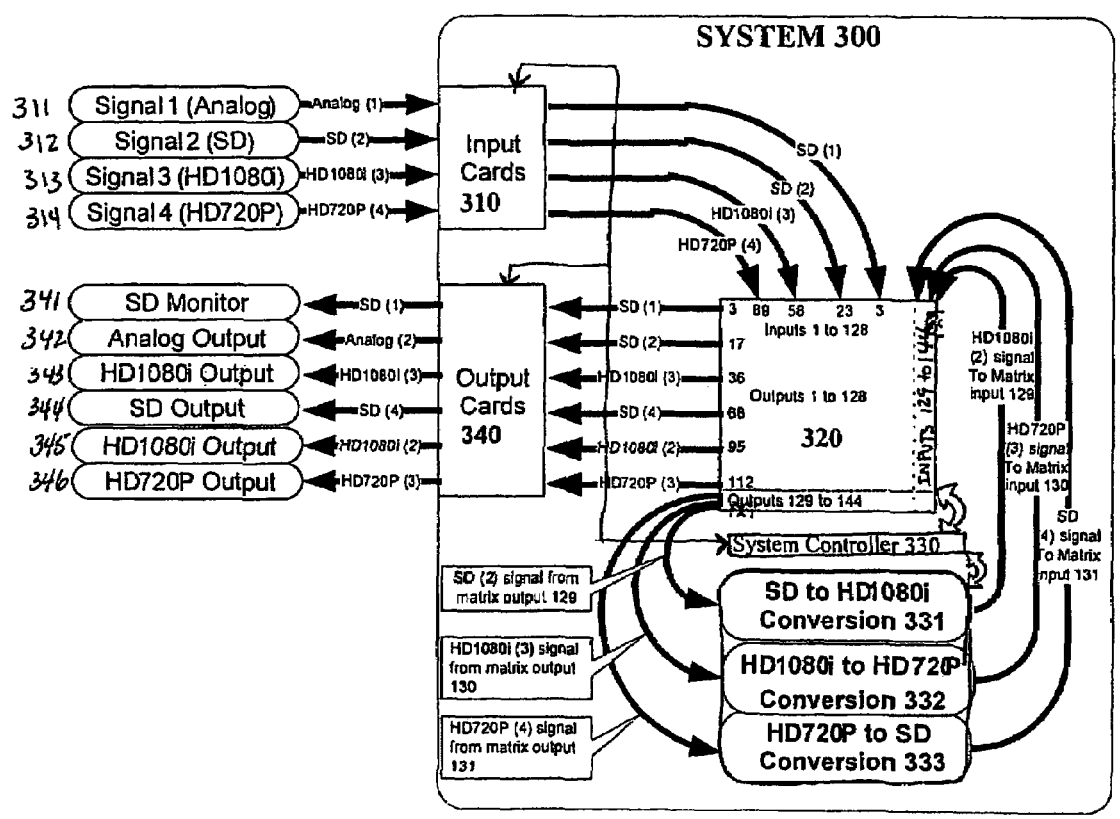
FIG. 3 shows an exemplary signal flow diagram.

An exemplary signal-switching scenario will now be described with reference to FIG. 3, which provides an exemplary illustration of how a system may be utilized. In FIG. 3, four exemplary signal inputs are input into the system 300. The input card 310 receives the four inputs 311, 312, 313, and 314 at four input terminals. In the illustrated example, input signal 311 is an analog signal, input signal 312 is a serial digital signal, input signal 313 is a high definition HD1080i and input signal 314 is a high definition HD720P signal.

As shown in FIG. 3, after signal 311 is input into the input cards 310, it undergoes an initial conversion into a serial digital signal, as represented by SD(1), as it enters matrix card 320.

Input signals 312, 313 and 314 do not undergo an initial conversion, but rather, are input into the matrix card 320 at normal input points.

As shown at the bottom of the matrix card 320, the user has specified three signals for signal conversion via the user interface of the system controller 330. In this embodiment, the conversion cards are shown as three separate conversion cards 331, 332 and 333, however, a single conversion card, which can perform any of the separate conversions, can be used. The user, through the user interface, may select any of the particular input signals for conversion. The signal conversion is performed based on the conversion parameter control signal within the system controller 330.

The signal conversion can be set by the system based on the user selections. An input signal of a format A, such as input signals 312, 313 or 314, can be routed by the user to an output requiring format B. The system controller 330 uses the system input signal (format A) format to automatically select, based on the initial configuration or via automatic signal format detection, matrix card 320 crosspoints to dynamically route the input signal (format A) through the correct processor or conversion card that converts the system input signal to format B and then, routes the converted signal to the output card 340. This dynamic selection and routing process is transparent to the user.

Referring to FIG. 3, input signal 312 is to be converted by conversion module 331 from an SD signal 2 to a high definition HD1080i standard format. The converted signal will be applied to one of the 16 remaining inputs available on the matrix card 320.

Input signal 313 is cross-converted from an HD1080i format to an HD720P format by conversion module 332. The converted signal output from conversion card 332 is applied to one of the remaining 16 unused inputs on matrix card 320.

Input signal 314 is down-converted, based on the conversion parameter control signal output by the system controller 330. Conversion card 333 will perform the down conversion of input signal 314 from a high definition HD720P format to an SD format. The output from conversion module 333 will be input into another one of the 16 remaining inputs of the matrix card 320.

All of the signals will be output from an output terminal on the matrix card 320 to the output cards 340, which may perform yet another conversion on the output signal. For example, output signal 342 is output-converted to an analog signal from an SD signal applied to the output card 340. Output signal 341 is directly connected to an SD monitor. Output signals 342 to 346 may be used by other systems or other devices capable of handling the formatted signal.

The processors or conversion cards can be dedicated to specific remaining inputs and outputs of a matrix card. It may be desirable to select which processor is assigned to each primary matrix card or switching circuit, when plural matrix cards are used.

Figure 4:
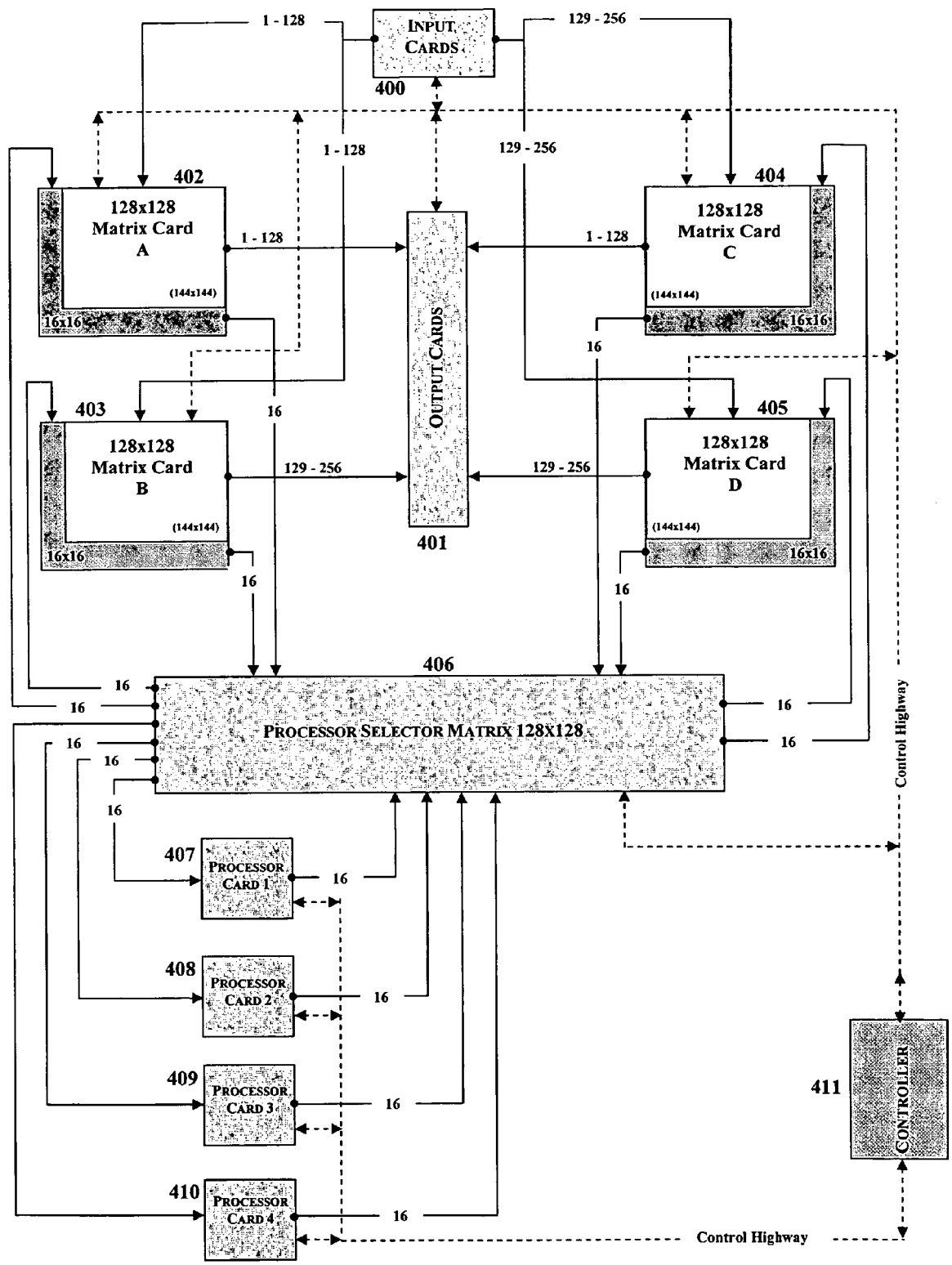
FIG. 4 shows exemplary signal flow diagram of another embodiment.

FIG. 4 illustrates another embodiment wherein with the addition of a processor selector matrix, any primary matrix card (e.g., plug-in card) can be assigned to any processor. The processor selector matrix card 406 can be alternately configured a card that provides fixed-signal connections, whereby the exemplary FIG. 4 interconnections in the system would remain the same.

FIG. 4 illustrates an exemplary system and signal flow of a system using a second switching circuit 406. An input signal is received by the input cards 400 and is routed to an input of one of the first switching circuits 402, 403, 404, and/or 405 and then on to an output of a first switching circuit 402, 403, 404, and/or 405 output. This routing is controlled by controller 411. The controller uses user-selection or automatic detection to determine the signal routing.

The outputted signal is applied to an input of the second switching circuit 406 that routes the signal to at least one of its outputs, which is applied to at least one processor card 407, 408, 409, or 410 input. The processor card 407, 408, 409, or 410 processes the signal based on a signal from controller 411, such as a conversion parameter control signal, applies the signal to its output, and routes the processed signal back to the second switching circuit 406. The second switching circuit 406 routes the processed signal to at least one first switching circuit 402, 403, 404, and/or 405 16×16 input. The first switching circuits 402, 403, 404, and/or 405 then routes the processed signal to the output cards 401, which output the processed signal from the system.

The processors 407, 408, 409 and 410 in the system can all be the same type of processor, can each be a different type of processor, or can be groups of like processors with each group being a different processor schema.

The size or number of first switching circuits 402, 403, 404, and/or 405, the number of processor cards 407, 408, 409, or 410, and the size of the second switching 406 can vary. The FIG. 4 embodiment is by way of an example that does not imply limits.

The processed signal, which is a second signal having a second format, can be routed in any of variety of paths. For example, the processed signal can be routed through a second (or more) processor to accomplish additional processing to satisfy customer requirements. The second signal may be routed after being split and output from the system, and in parallel, the same second signal can be routed through additional processors before being output from the system as a third signal having a third format. For example, the first processor 407 may perform a format conversion, which is output from the system while the same format converted signal is also routed to a second processor 408 where the format converted signal is compressed before the format converted compressed signal is output from the system.

The controller 411 can be configured to control all of the signal routing and process settings in a manner which is transparent to the operator/user.

The above-described switching scenario is exemplary, and one skilled in the art would understand that a single signal can be converted into more than the one converted format. In addition, a single input signal, converted or unconverted, may be output via a plurality of output terminals limited, only by the available number of output terminals of the implementing device.

The previous signal descriptions are exemplary, and any variety or groupings of input signals and output signals can be converted into a number of various signal conversion types and signal processing can be performed on any of the signals that are input to the exemplary device, either automatically or by operator intervention.

Other types of signal enhancements or processing offered in devices external to the switching matrix can be incorporated into the disclosed system. By using an internal cross-point input/output re-entry architecture, internal signal processing capability can provide additional features such as: source or channel identification embedded into selected signals on selected system outputs while still providing the original system input as a "clean feed" to other system outputs.

Additionally, embedding or de-embedding audio or data channels from a video signal path; diagnostics for signal analysis or internal test signal generation; frame synchronization; embedded logo generation for output channel branding; digital video effects, such as animated graphics; adjustable delay, "clean switch" functions, etc., can be implemented.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A system for performing signal processing, comprising:
    a system input for receiving a selection input for format conversion of a first signal having a first format and supplied on a first system input;
    a switching circuit having plural switching circuit inputs and plural switching circuit outputs for routing the first signal, received via a first switching circuit input of the switching circuit, to a first switching circuit output of the switching circuit; and
    a processor connected to the switching circuit for processing, based on the received selection input, the first signal received via the first switching circuit output into a second signal having a second format, and supplying the second signal to a second switching circuit input of the switching circuit,
    wherein the switching circuit is configured to route the second signal, received from the processor via the second switching circuit input, to a first system output via a second switching circuit output of the switching circuit.

2. The system of claim 1, comprising:
    a user interface for receiving the selection input from a user to select the first signal.

3. The system of claim 1, wherein when a user selects the first signal to have a same format as the second signal, the switching circuit is configured to receive the first signal at the first switching circuit input, and route the first signal to the first switching circuit output to be output via a second system output.

4. The system of claim 1, wherein the signal processing is at least one of: up-conversion; down-conversion cross-conversion; analog-to-digital conversion; digital-to-analog conversion; embedding with source or channel identification, audio or data channel conversion from a video signal path; diagnostics; frame synchronization; embedding logo generation; addition of digital video effects, and introduction of an adjustable delay, or any combination thereof.

5. The system of claim 1, comprising:
    a system controller for controlling the system by dynamically controlling the routing of the first signal, the processing of the first signal, and outputting of the second signal.

6. The system of claim 5, wherein the system controller dynamically controls the routing, conversion and output based on the first format of the first signal, the first system input, the second format of the second signal, and the first system output.

7. The system of claim 1, comprising an automatic format detection module for detecting the format of the first signal, wherein the first switching circuit routes the first signal to the processor for processing based on the detected format of the first signal.

8. A method for processing a signal comprising:
    receiving a selection input for format conversion of a first signal of plural input signals having a first format;
    inputting the first signal into a switching circuit on a first switching circuit input of the switching circuit;
    outputting the first signal from a first switching circuit output of the switching circuit to a processor based on the received selection input;
    processing, based on the received selection input, the first signal to a second signal having a second format for input to a second switching circuit input of the switching circuit; and
    outputting the second signal from a second switching circuit output of the switching circuit to a system output having an output signal format matching the second format.

9. The method of claim 8, wherein the selection input is received from a user via a user interface or by automatic detection of the signal format of the first signal.

10. The method of claim 8, wherein the processing is at least one of: up-conversion; down-conversion; cross-conversion; analog-to-digital conversion; digital-to-analog conversion; embedding with source or channel identification; audio or data channel conversion from a video signal path; diagnostics; frame synchronization; embedding logo generation; addition of digital video effects, and introduction of an adjustable delay; detection; signal correction; generation; signal combining; synchronization; encoding; decoding; transcoding; embedding; de-embedding; identification; scrambling; descrambling compression; decompression or any combination thereof.

11. A system for performing signal processing, comprising:
    an input module having plural system inputs for receiving input signals having different input signal formats, and receiving a first signal selected by a user for conversion on a system input;
    an output module having plural system outputs for outputting signals having different output signal formats, wherein at least one of the plural different output signal formats is processed within the system;
    a switching circuit having plural switching circuit inputs and plural switching circuit outputs, and configured to receive the first signal at a first switching circuit input of the switching circuit and route the received first signal to a first switching circuit output of the switching circuit to be output; and
    a conversion card for processing, based on the received selection input, the first signal output from the first switching circuit output into a different signal format for direct input to a second switching circuit input of the switching circuit,
    wherein the switching circuit is configured to route a signal having the different signal format, received from the conversion card via the second switching circuit input, to at least one of the plural system outputs of the output module.

12. The system of claim 11, wherein the processing is at least one of: up-conversion; down-conversion; cross-conversion; analog-to-digital conversion; digital-to-analog conversion; embedding with source or channel identification; audio or data channel conversion from a video signal path; diagnostics; frame synchronization; embedding logo generation; addition of digital video effects, and introduction of an adjustable delay, or any combination thereof.

13. The system of claim 11, comprising:
a system controller for controlling the system by dynamically controlling the routing of the first signal and the processing of the first signal.

14. The system of claim 12, wherein the system controller dynamically controls the routing and processing based on a first format of the first signal, the system input, and a second format of the different signal.

15. The system of claim 11, comprising at least one other switching circuit having plural switching circuit inputs and plural switching circuit outputs, wherein the other switching circuit is connected between the switching circuit and the conversion card.

16. The system of claim 11, comprising an automatic format detection circuit for detecting the format of the first signal, wherein the switching circuit routes the first signal to the conversion card for processing based on the detected format of the first signal.

17. A system for performing signal processing, comprising:
a system input for receiving a selection input for format conversion of a first signal having a first format and supplied on a first system input;
a first switching circuit having plural switching circuit inputs and plural switching circuit outputs for routing the first signal, received via an input on the first switching circuit, to a first output on the first switching circuit;
a second switching circuit, connected to the first switching circuit, having plural switching circuit inputs and plural switching circuit outputs for routing the first signal received from the first output of the first switching circuit, via a first input of the second switching circuit to a first output of the second switching circuit; and
a processor connected to the second switching circuit for processing, based on the received selection input, the first signal received via the first output of the second switching circuit into a second signal having a second format, and supplying the second signal to a second input of the second switching circuit to be routed to a second output of the second switching circuit by the second switching circuit,
wherein the first switching circuit is configured to receive, via second input of the first switching circuit, the second signal from the second output of the second switching circuit, and output the second signal to a system output via a second output on the first switching circuit.

18. The system of claim 17, wherein the second signal is routed and output from the system, and in parallel, the same second signal is routed through additional processors before being output from the system as a third signal having a third format.

19. The system of claim 17, comprising an automatic format detection circuit for detecting the format of the first signal, wherein the first and second switching circuits route the first signal to the processor for processing based on the detected format of the first signal.

* * * * *